United States Patent

[11] 3,579,003

[72] Inventor Robert C. Gray
 280 Clifford St., Blackfoot, Idaho 83221
[21] Appl. No. 846,471
[22] Filed July 31, 1969
[45] Patented May 18, 1971

[54] MAGNETIC BRAKING SYSTEM
 10 Claims, 9 Drawing Figs.
[52] U.S. Cl. .................................................. 310/93
[51] Int. Cl. ............................................. H02k 49/10
[50] Field of Search ........................................ 310/103, 105, 104

[56] References Cited
UNITED STATES PATENTS
1,333,415  3/1920  Henry ............................ 310/103
2,768,316  10/1956  Neiss ............................ 310/95

*Primary Examiner*—D. X. Sliney
*Attorney*—C. Harvey Gold

ABSTRACT: A magnetic braking system for braking the motion of a moving member including first magnet means mounted on the moving member, a support frame positioned proximate the moving member, second magnet means having a polarity opposite the polarity of the first magnet means secured to the support frame, and positioning means for moving the second magnet means on the support frame to a position proximate the first magnet means wherein the magnetic flux between the first and second magnet means brakes the motion of the moving member.

INVENTOR.
ROBERT C. GRAY

BY

HIS ATTORNEY

INVENTOR.
ROBERT C. GRAY
BY
C. Harry Gold
HIS ATTORNEY

MAGNETIC BRAKING SYSTEM

BACKGROUND OF THE INVENTION

Mechanical braking systems which include a friction element that is applied to an element in motion are well known. The friction and resulting drag between the coacting elements, of course, act as a brake on the movement of the one element. However, because of the friction required to effectuate braking substantial component wear can result. Accordingly, attempts have been made to devise other types of braking systems which minimize wear. One such system is an electromagnetic braking system where, for example, in a generator the electromagnetic force field is reversed with respect to the rotating armature.

BRIEF DESCRIPTION OF THE INVENTION

In its broadest form the invention comprises a magnetic braking system for braking the motion of a moving member which comprises first magnet means mounted on the moving member; a fixed support frame positioned proximate said moving member; second magnet means having a polarity opposite the polarity of said first magnet means secured to said support frame; and positioning means for moving said second magnet means on the support frame to a position proximate said first magnet means wherein the magnetic flux between the first and second magnet means brake the motion of said moving member.

In another embodiment of the invention the moving member is a rotor and the first magnet means comprises a plurality of bar magnets radially mounted on the rotor.

In still another embodiment of the invention the first magnet means is a bar magnet and the second magnet means can be moved to a position proximate each end of the bar magnet.

In yet another embodiment of the invention the second magnet means comprises a plurality of bar magnets movably mounted on the support frame to coact with a plurality of bar magnets attached to a rotor.

BRIEF DESCRIPTION OF THE DRAWINGS

So that the invention may be more readily understood and carried into effect reference is made to the accompanying drawings which are offered by way of example only and are not to be taken as limiting the invention, the scope of which is defined by the appended claims which are intended to embrace equivalent structures.

DESCRIPTION OF THE PREFERRED EMBODIMENT

Figure 1:
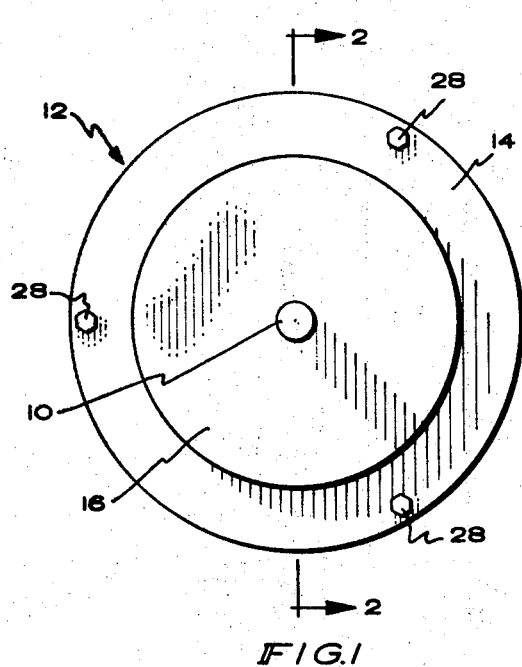
FIG. 1 is an end view of one type of magnetic braking device conforming to the system of this invention.
Figure 2:
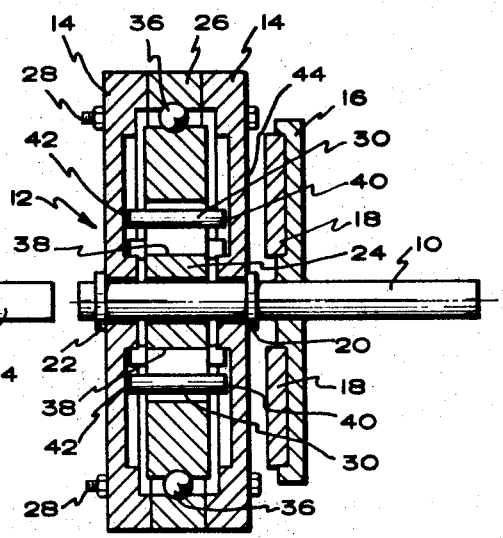
FIG. 2 is a sectional view taken in the line of 2–2 of FIG. 1 looking in the direction of the arrows.
Figure 3:
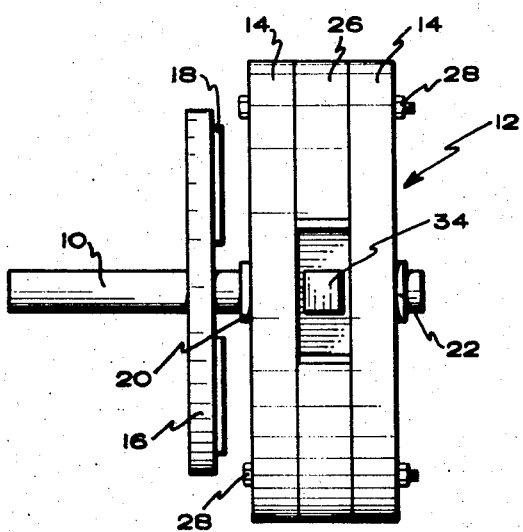
FIG. 3 is a side view of the braking device shown in FIG. 1.
Figure 4:
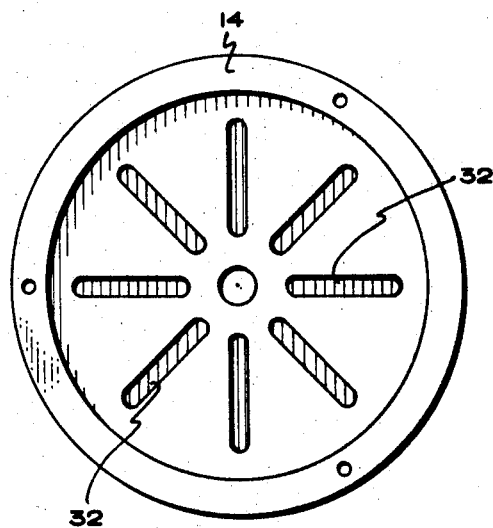
FIG. 4 is a top view of a stator end plate.
Figure 5:
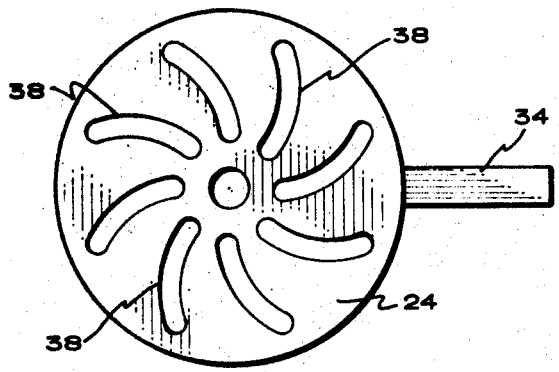
FIG. 5 is a top view of one type of positioning rotor suitable for use with the braking device of this invention.

Referring now more specifically to the magnetic braking system of this invention. Rotor shaft 10 is rotatably mounted at one end to stator 12 to extend axially outward away from one of the stator's end plates 14. Rotor 16 is fixedly connected to shaft 10 so that rotation of the shaft is imparted to the rotor. A plurality of magnets 18, hereinafter described, are affixed to rotor 16 for braking purposes. Stays 20 and 22 are connected to shaft 10 on opposite sides of stator 12 to prevent the shaft from axially moving out of the stator as it rotates therein. Stator 12 includes end plates 14 positioned on opposite sides of a positioning rotor 24 with spacer ring 26. The stator is secured together with conventional clamping means such as bolts 28 so that rotor 24 easily rotates between said end plates and thereby position internally mounted bar magnets 30 towards the stator's center axis and away from said axis as hereinafter described.

A plurality of radially extending guide slots 32, sized to slidably receive the end of a transversely positioned bar magnet 30, are formed in each of the end plates 14. Accordingly, by properly spacing the end plates bar magnets 30 radially move in the stator towards and away from its center axis while being held in a position substantially parallel to said center axis. Movement of the bar magnet 30 is controlled through the movement of handle 34 secured to positioning rotor 24 and passed through the opening in spacer ring 26. To ensure ease in operation, rotor 24 can ride on ball bearings 36 which in turn ride in a bearing race formed along the inside face of spacer ring 26. Bar magnets 30 extend through arched rotor slots 38 and are slidably mounted therein so that magnets 30 are urged to move radially inward or outward in the end plate guide slots 32 when positioning rotor 24 is turned. Bar magnets 30 are preferably of a circular or rod design to ensure ease of operation. In addition, all of the magnets 30 are preferably mounted between end plates 14 so that common poles are positioned on the same side of stator 12, e.g., the north poles 40 of the magnets are positioned on the side of the stator adjacent to rotor 16 and the south poles 42 of the magnets are positioned on the opposite side of the stator.

Figure 8:
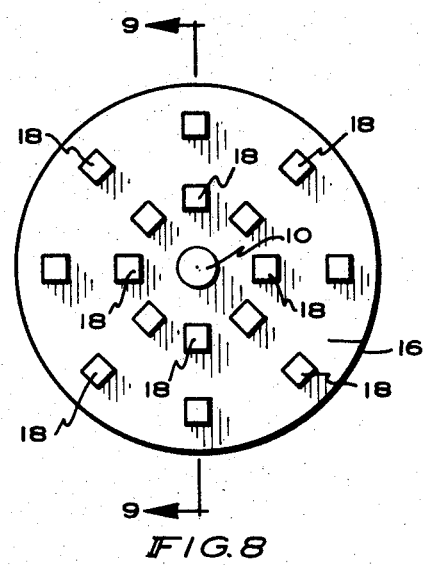
FIG. 8 is a front view of a preferred magnet rotor.
Figure 6:
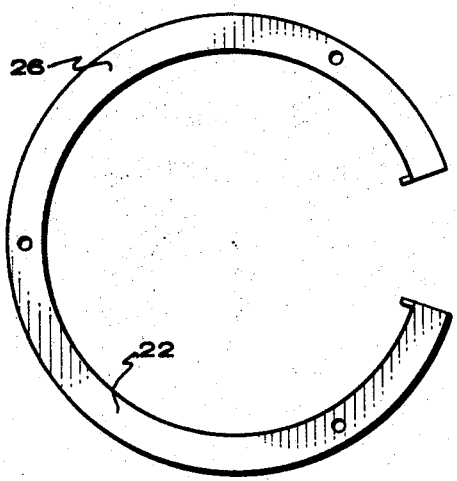
FIG. 6 is a top view of a spacer ring.
Figure 9:
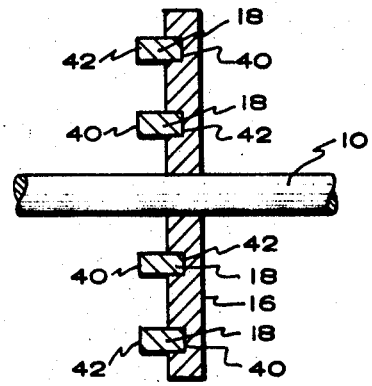
FIG. 9 is a sectional view of FIG. 8 taken in the plane of line 9–9 looking in the direction of the arrows.
Figure 7:
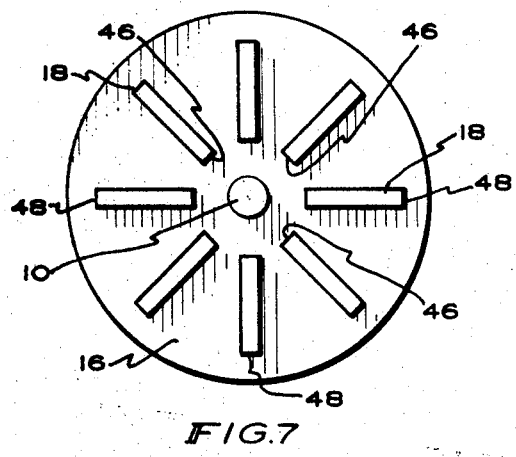
FIG. 7 is a front view of the bar magnet rotor and connected support shaft.

Bar magnet rotor 16 is rotatably mounted to stator 12 so that magnets 18 which are attached to the rotor are positioned adjacent to the end face 44 of the stator. When magnets 18 are elongated bar-type magnets they are preferably sized to substantially correspond with guide slots 32 formed in end plates 14 so that the ends of magnets 30 positioned adjacent to rotors 16 can move from one end to the other end of the radially extending bar magnets by manipulating positioning rotor 24 as herein described. Optionally, as shown in FIGS. 8 and 9, bar magnets 18 can be positioned endwise in rotor 16 at the proximate opposite ends of guide slots 32.

Common poles of all of the bar magnets 18 secured to rotor 16 are preferably positioned towards the center axis of rotor 16, e.g., the north poles 40 of magnets 18 are positioned inwardly towards the center axis of rotor 16 and the south poles 42 of the magnets are positioned outwardly away from the center axis. Accordingly, depending on the arrangement of magnets 18 and 30 a magnetic attraction or repulsion is exerted therebetween. When there is a magnetic attraction a braking force is applied to rotation of rotor 16 with respect to stator 12 because of the magnetic flux between the opposite magnet poles. To maximize the braking effect the magnets are preferably arranged so that there is a magnetic attraction between them, i.e., dissimilar poles of magnets 18 and 30 are positioned adjacent to each other, when magnets 30 are in their outermost position in guide slots 32 with respect to the center axis of stator 12.

To operate the braking system of this invention rotor 16 is rotated with respect to stator 12. Rotation continues so long as the poles of magnets 18 are adjacent to similar poles of magnets 30, and this is preferred. Braking of the movement of rotor 16 is effectuated by moving rotor handle 34 to thereby urge magnets 30 to a position in stator 12 wherein their end poles are adjacent to dissimilar end poles of magnets 18 and lines of braking magnetic flux are set up between said poles. As indicated, the flux acts as a braking force to restrain continued movement of rotor 16.

It is to be noted that operation of the braking system of this invention is maximized by constructing stator 12, and especially its end plate 14 positioned adjacent to rotor 14, as well as said rotor 14, from nonmagnetic materials such as brass, aluminum, stainless steel, synthetic resins such as nylon, etc. It is to be further noted that while the invention specifically described herein relates to braking means structure for a rotating member it is within the scope of this invention to apply the same magnetic braking principles herein described, i.e., positioning dissimilar magnetic poles together, to brake other types of movement such as linear movement. It is also, of course, within the scope of this invention to use a stator with fixed magnets and provide means in combination with the rotor to reposition the magnets attached to the rotor.

I claim:

1. A magnetic braking system for braking the motion of a moving member comprising a support frame fixedly positioned with respect to said moving member; first magnet means attached to said moving member; second magnet means secured to said support frame having a polarity opposite the polarity of the first magnet means; and positioning means connected to said support frame and said second magnet means for moving the second magnet means to a position proximate the first magnet means attached to said moving member wherein the magnet flux between the first and second magnet means brakes the motion of said moving member with respect to said support frame.

2. The magnetic braking system of claim 1 wherein said moving member is a rotor rotatably attached to said support frame.

3. The magnetic braking system of claim 2 wherein said first magnet means comprises a plurality of radially extending bar magnets positioned about the face of said rotor proximate said support frame such that the magnets have common poles positioned towards and away from the center axis of said rotor.

4. The magnetic braking system of claim 3 wherein said second magnet means comprises a plurality of magnets equal in number to the first magnets.

5. The magnetic braking system of claim 4 wherein the polarity of each of the second magnets is opposite to the polarity of the ends of the first bar magnets positioned furthest away from the center axis of said rotor.

6. A magnetic braking system for braking the motion of a moving member comprising a support frame fixedly positioned with respect to said moving member; first magnet means attached to said moving member; second magnet means secured to said support frame having a polarity opposite the polarity of the first magnet means; and positioning means connected to said moving member and said first magnet means for moving said first magnet means to a position proximate said second magnet means attached to said support frame wherein the magnet flux between the first and second magnet means brakes the motion of said moving member with respect to said support frame.

7. The magnetic braking means of claim 6 wherein said moving member is a rotor rotatably attached to said support frame.

8. The magnetic braking means of claim 7 wherein said second magnet means comprises a plurality of radially extending bar magnets secured to the face of said support frame proximate said rotor such that the magnets have common poles positioned towards and away from the center axis of said rotor.

9. The magnetic braking means of claim 8 wherein said first magnet means comprises a plurality of magnets equal in number to the second magnets.

10. The magnetic braking system of claim 9 wherein the polarity of each of the first magnets is opposite to the polarity of the ends of the second bar magnets positioned furthest away from the center axis of said rotor.